United States Patent
Hemphill

(10) Patent No.: US 6,565,792 B2
(45) Date of Patent: May 20, 2003

(54) APPARATUS AND METHOD FOR USE IN MOLDING A COMPOSITE STRUCTURE

(75) Inventor: W. Scott Hemphill, Newark, DE (US)

(73) Assignee: Hardcore Composites, New Castle, DE (US)

( * ) Notice: Subject to any disclaimer, the term of this patent is extended or adjusted under 35 U.S.C. 154(b) by 0 days.

(21) Appl. No.: 09/853,993

(22) Filed: May 11, 2001

(65) Prior Publication Data

US 2002/0167119 A1 Nov. 14, 2002

(51) Int. Cl.[7] .......................... B29C 70/48; B29C 70/44
(52) U.S. Cl. .................... 264/510; 264/571; 425/129.1; 425/389; 425/405.1
(58) Field of Search ................................. 264/510, 571; 425/389, 405.1, 129.1, 120, 123

(56) References Cited

U.S. PATENT DOCUMENTS

| | | | |
|---|---|---|---|
| 2,495,640 A | * | 1/1950 | Muskat |
| 2,769,202 A | * | 11/1956 | Thompson |
| 2,794,756 A | * | 6/1957 | Leverenz |
| 3,028,284 A | * | 4/1962 | Reeves |
| 3,074,111 A | * | 1/1963 | Wiltshire |
| 3,137,750 A | * | 6/1964 | Gringas |
| 3,309,450 A | * | 3/1967 | Rodgers |
| 4,359,437 A | * | 11/1982 | le Comte .................... 264/571 |
| 4,468,363 A | * | 8/1984 | Miessler .................. 425/129.1 |
| 4,560,523 A | * | 12/1985 | Plumley et al. ............. 425/389 |
| 4,622,091 A | | 11/1986 | Letterman ................... 156/286 |
| 4,902,215 A | | 2/1990 | Seemann, III .............. 425/389 |
| 4,942,013 A | | 7/1990 | Palmer et al. ............... 264/571 |
| 5,052,906 A | | 10/1991 | Seemann ..................... 425/112 |
| 5,364,584 A | * | 11/1994 | Imanara et al. ............. 264/510 |
| 5,565,162 A | * | 10/1996 | Foster ......................... 264/257 |
| 5,656,231 A | * | 8/1997 | Blackmore .................. 264/258 |
| 5,665,301 A | | 9/1997 | Alanko ........................ 264/571 |
| 5,721,034 A | | 2/1998 | Seemann, III et al. |
| 5,958,325 A | | 9/1999 | Seemann, III et al. ...... 264/571 |

* cited by examiner

*Primary Examiner*—Robert Davis
(74) *Attorney, Agent, or Firm*—Boyle Fredrickson Newholm Stein & Gratz S.C.

(57) ABSTRACT

An apparatus for molding a composite structure which includes an insert that is pervious to a flowable resin, and a mold having a cavity defining contiguous upper and lower portions. The upper portion is adapted to receive a fibrous pre-form, and the lower portion is adapted to receive the insert. The insert defines a volume to accommodate a pool of the flowable resin. Also, the insert preferably includes a plurality of fluid transferable elements. The fluid transferable elements preferably include a generally planar plate and an expanded metal pre-form, wherein the plate and the expanded metal pre-form are configured to facilitate resin flow in a direction generally orthogonal to a bottom surface of the mold to distribute the resin uniformly across the mold cavity. In addition, a method of vacuum assisted resin transfer molding includes the steps of providing a rigid mold having a shape corresponding to the part to be formed, and then positioning an insert in the mold to define a reservoir for containing a pool of resin, the insert including a plurality of mutually spaced openings. Next, the method includes positioning a fibrous pre-form on the insert, and then injecting resin through the mold to flood the reservoir.

24 Claims, 4 Drawing Sheets

APPARATUS AND METHOD FOR USE IN MOLDING A COMPOSITE STRUCTURE

BACKGROUND OF THE INVENTION

1. Field of the Invention

The present invention is directed to forming composite parts and, more particularly, a vacuum assisted resin transfer molding (VARTM) apparatus and method for uniformly wetting out a fibrous pre-form by minimizing lateral travel of the uncured resin.

2. Description of Related Art

Known methods and apparatus have been used to impregnate dry fibrous materials by introducing a resin to the material under vacuum conditions, and then curing the resin to produce the composite part. One particular method employing a vacuum bag molding process, or vacuum assisted resin transfer molding (VARTM) process, includes placing a fiber lay-up in a rigid mold having a shape corresponding to the composite part being produced. Notably, such processes take advantage of a desired amount of compression provided by a vacuum bag used to enclose the resin impregnated fiber lay-up under vacuum pressure. To promote uniform and complete "wet-out" of the fiber lay-up, the vacuum operates to remove entrapped air in the lay-up as its formed into the composite structure. As a result, such systems generally avoid the creation of areas of the lay-up that are not infused with resin, which can compromise the structural integrity of the part. After wetting-out the fiber, the resin is then cured to complete the structure.

The lay-ups used in known systems for manufacturing solid and cored laminate composite structural members are typically made from glass or carbon fiber or other suitable fiber, or polyester cloth. To enhance structural characteristics of the member, such systems typically employ a number of plies of such fiber-reinforced material. Notably, known vacuum assisted resin transfer molding processes have been used to manufacture non-cored structures, as well as cored structures that include a core material disposed in the lay-up.

With more particular reference to making non-cored structures, a fibrous lay-up is initially placed in a self-contained mold having a desired shape. Then, typically, a resin distribution medium is placed on top of the lay-up. The medium separates the lay-up from a structure for maintaining vacuum pressure in the system, such as a flexible vacuum bag, and facilitates flow of uncured resin in the system by providing flow paths between the bag and the lay-up. The vacuum bag is fluid impervious and sealed to allow applied vacuum pressure to pull the resin through the fibrous lay-up, as noted previously. Also, a resin inlet is disposed, preferably, adjacent to the vacuum bag with the bag being sealed thereto to maintain vacuum pressure.

Similar apparatus is used to manufacture cored structures. However, the fibrous lay-up employed in manufacturing cored structures includes, typically, fiber-wrapped core structures made of, for example, balsa wood. As with the non-cored structures, the lay-up is then placed in a rigid mold and a vacuum bag is placed thereon and sealed thereto to maintain vacuum pressure. Further, a distribution medium may be employed, either between the core structures and the fibrous material wrapped thereon, or between the fiber wrapped cores and the vacuum bag, to promote uniform resin flow upon application of vacuum pressure. For both cored and non-cored structures, the resin in then cured and the composite part and the rigid mold are separated.

Current systems take 4–8 hours to disperse the resin through the fibrous lay-up. Notably, as the resin cures, it diminishes the effective area of the vacuum and in some instances seals areas in which resin has not fully infused the material. Where imperfect wetting occurs, the dry spots create inferior composite structures. As a result, some known systems attempt to create uniform flow of resin through the material in an effort to eliminate dry spots.

Generally, such systems position vacuum and resin ports in order to compensate for the effects of gravity, and to facilitate lateral movement of the resin. As a result, different portions of the fibrous structure may be infused. Typically, resin originating from one or more ports is caused to travel, for example, upwardly and laterally under pull from a vacuum source that is in a generally vertical direction, i.e., vacuum pressure is applied generally only in the Z direction. As the resin tends to move upwardly towards the vacuum port(s), the resin is dispersed in the X, Y and Z directions to infuse the lay-ups. To direct resin laterally from a narrow resin inlet channel prior to impregnating the lay-up, at least some known systems employ a disbursement medium. The medium creates channels that facilitate resin flow; however, much of the resin entering the mold still flows laterally (i.e., in the X and Y directions) within the lay-up. Typically, the resin moves as a wave, laterally infusing top portions of the lay-up before corresponding bottom portions, as the resin moves towards the vacuum port.

Overall, non-uniform resin flow results in different portions of the lay-up being infused with resin at different times. More particularly, resin travels the entire thickness of different lateral portions of the lay-up at different times, thus increasing the amount of process time required. Worse yet, this non-uniform, multi-directional resin flow increases the chances that unknown portions of the lay-up remain dry, thus creating weak spots and compromising the integrity of the finished part.

Therefore, the art is in need of an apparatus and method which eliminates or minimizes the existence of multi-direction flow of the resin to facilitate more uniform wet-out the fibrous pre-form. As a result, the apparatus should decrease the amount of time required to wet-out the fiber. Moreover, by minimizing or eliminating multi-directional resin flow, the apparatus and method should lessen the likelihood of dry spots in the resultant hardened composite part.

SUMMARY OF THE INVENTION

The preferred embodiment is directed to a vacuum assisted resin transfer molding (VARTM) process to produce fiber reinforced composite structures that facilitates more uniform and more time efficient resin infusion of the fibrous pre-form without requiring a distribution medium. In particular, the preferred embodiment uses a VARTM apparatus and method that maintains resin flow in the pre-form that is generally orthogonal, across the entire footprint of the pre-form, to a plane defined by a bottom surface of the corresponding rigid mold. As a result, the fibrous pre-form of the composite part is uniformly infused with resin, thus insuring the integrity of the completed part, yet correspondingly minimizing the time required to infuse the structure.

Accordingly, one aspect of the preferred embodiment includes an apparatus for molding a composite structure which includes an insert that is pervious to a flowable resin, and a mold having a cavity defining contiguous upper and lower portions. The upper portion is adapted to receive a fibrous pre-form, and the lower portion is adapted to receive the insert. Notably, the insert defines a volume to accommodate a pool of the flowable resin.

In accordance with another aspect of the invention, the insert includes a plurality of fluid transferable elements. The fluid transferable elements preferably include a plate having generally mutually spaced cylindrical openings and an expanded metal pre-form. The plate and the expanded metal pre-form are configured to facilitate resin flow in a direction generally orthogonal to a bottom surface of the mold to distribute the resin uniformly across the mold cavity.

According to another aspect of the preferred embodiment, the resin flows through the insert in a direction generally orthogonal to a planar interface between the lower portion and the upper portion of the cavity.

According to a further aspect of the preferred embodiment, an apparatus for use in molding a composite structure includes a rigid mold having a shape corresponding to a shape of the composite structure to be formed. The rigid mold is configured to receive a fibrous pre-form and an insert that defines a reservoir for containing a pool of resin. The insert is disposed generally adjacent to at least a portion of the rigid mold intermediate the rigid mold and the fibrous pre-form.

According to another aspect of the preferred embodiment, a method of vacuum assisted resin transfer molding includes the steps of providing a rigid mold having a shape corresponding to the part to be formed, and then positioning an insert in the mold to define a reservoir for containing a pool of resin, the insert including a plurality of mutually spaced openings. Next, the method includes positioning a fibrous pre-form on the insert, and then injecting resin through the mold to flood the reservoir.

According to another aspect of the preferred embodiment, the above-described method further includes sealing the mold with a vacuum bag prior to the injecting step and then applying vacuum pressure to the apparatus so as to uniformly pull the resin through the openings of the insert in a direction generally parallel to a corresponding longitudinal axis of each of the openings generally simultaneously across the entire planar interface between the insert and the fibrous pre-form. Then, curing the resin to complete the composite structure.

According to another aspect of the preferred embodiment, an apparatus for forming a composite structure using a VARTM process employs a rigid mold includes an insert disposed adjacent to a bottom surface of the rigid mold, wherein the insert facilitates resin flow in a direction generally orthogonal to the bottom surface.

These and other objects, features, and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

The present invention will become more fully understood from the following detailed description, taken in conjunction with the accompanying drawings, wherein like reference numerals refer to like parts, in which.

DETAILED DESCRIPTION OF THE PREFERRED EMBODIMENTS

Figure 1:
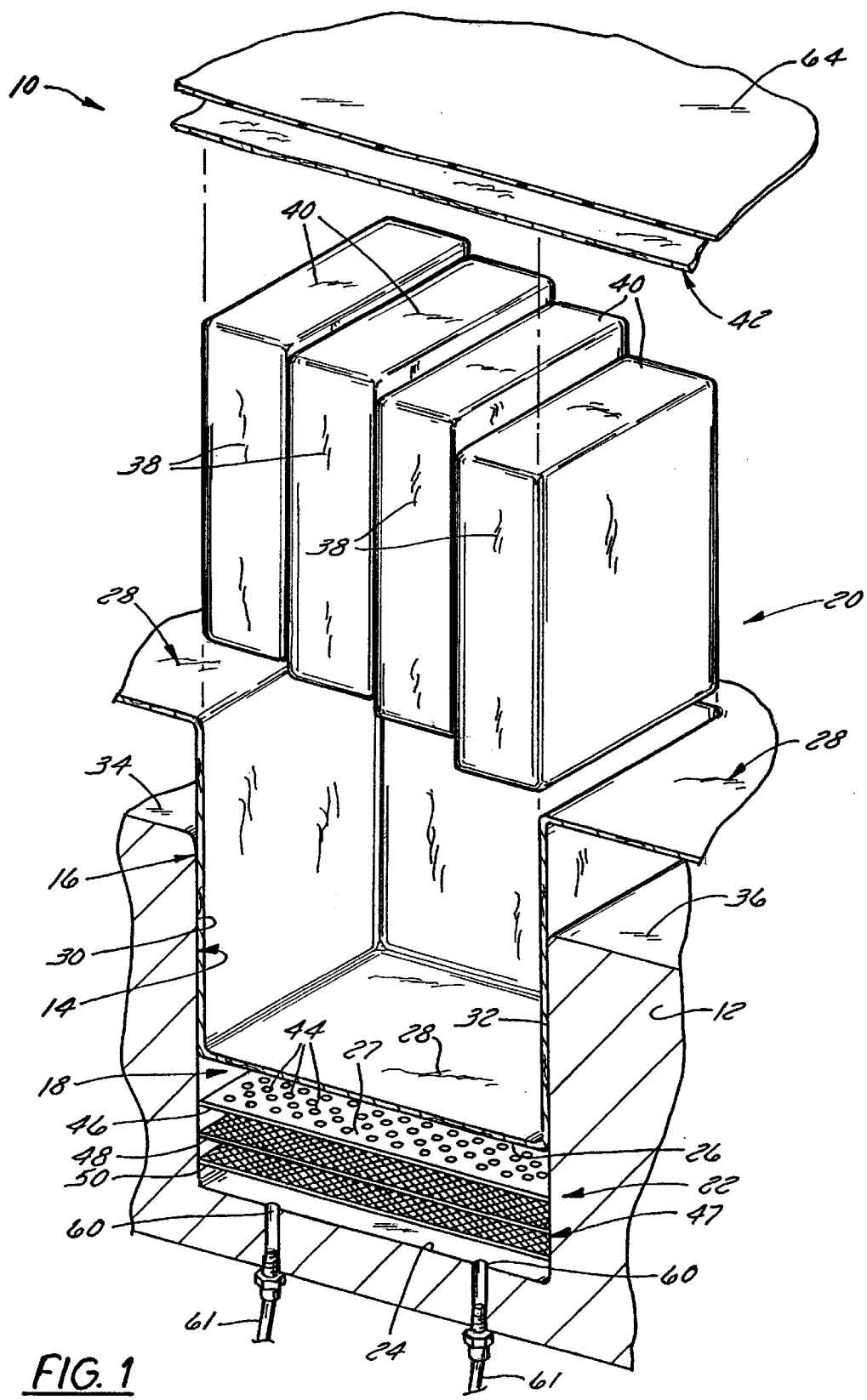
FIG. 1 is a partially broken away exploded perspective view of an apparatus according to a preferred embodiment of the present invention.
Figure 2:
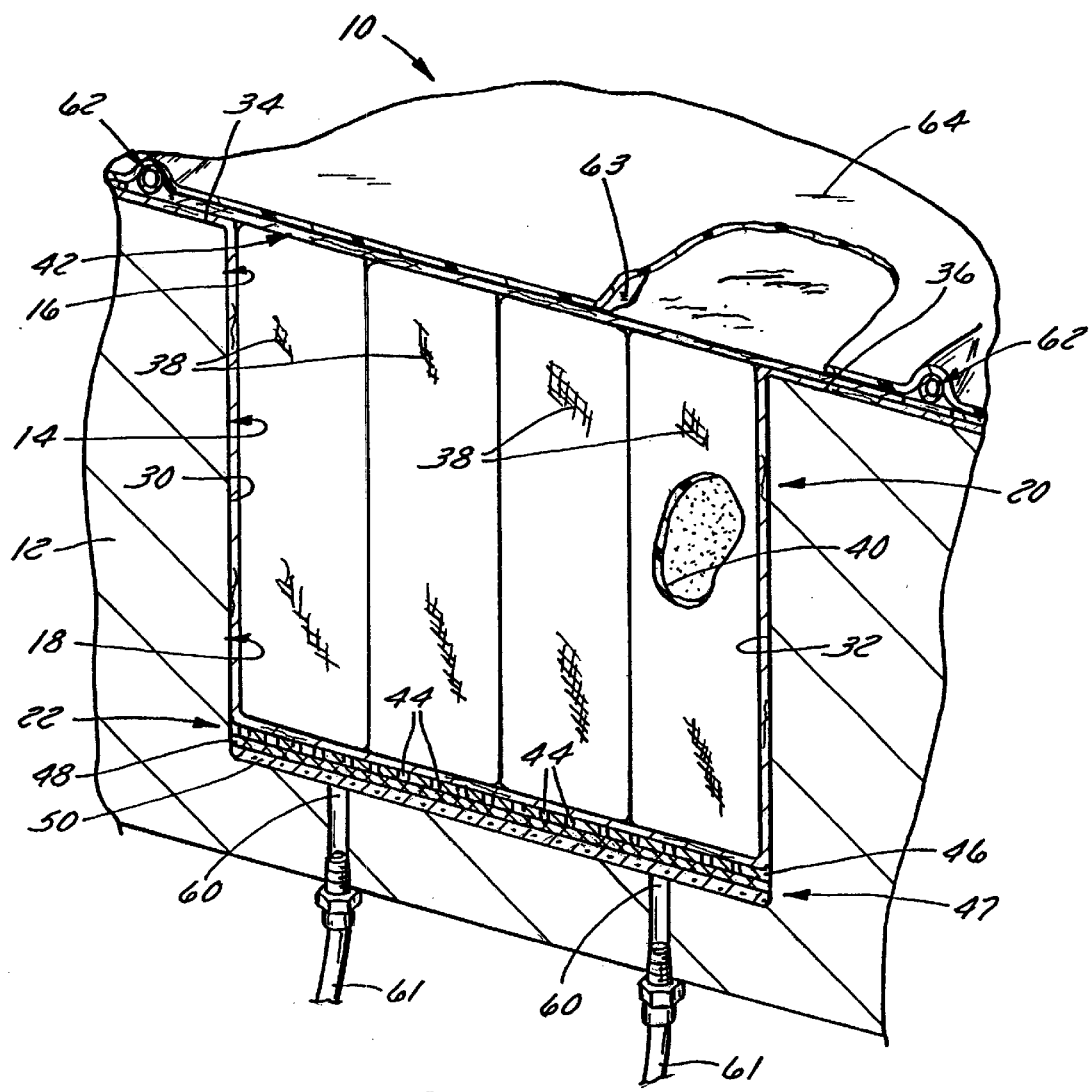
FIG. 2 is a partially broken away perspective view of the preferred embodiment shown in FIG. 1, with the apparatus assembled for composite part manufacture.

FIGS. 1 and 2 illustrate an assembly 10 for use in molding a composite structure according to a vacuum assisted resin transfer molding process. Apparatus 10 employs a rigid mold 12 having a predetermined shape corresponding to the part to be produced. In this case, mold 12 has an elongated rectangular shape for producing a part that may be used, for example, as a bridge deck panel. Next, mold 12 defines a cavity 14 having upper and lower portions, 16, 18, respectively, that are configured to receive a fibrous pre-form 20 and an insert or sub-mold 22, as described below.

More particularly, insert 22 is disposed in rigid mold 12, preferably adjacent a bottom surface 24 of mold, and is accommodated by lower portion 18 of cavity 14. Further, fibrous pre-form 20 is disposed on insert 22 such that it resides in upper portion 16 of cavity 14. (See FIG. 2) As a result, a bottom surface 26 of pre-form 20 lies adjacent to a top surface 27 of insert 22, thus defining a planar interface therebetween. Notably, as described in further detail below, lower portion 18 of cavity 14 (and thus insert 22) defines a reservoir for containing a pool of resin (e.g., an epoxy, etc.) that is preferably supplied via resin inlets 60 coupled to feed tubes 61.

With continued reference to FIGS. 1 and 2, bottom surface 26 of fibrous pre-form 20 is defined by a first layer 28 of fiber-reinforced fabric that is formed in mold 12 generally adjacent to opposed walls 30, 32 and top surfaces 34, 36 of the mold. In this example, fibrous pre-form 20 also includes at least one core 38 that is shaped and made from a material suitable for the application, e.g., a bridge deck panel. Typical core materials may include foams comprising, for example, a polyurethane or a polyvinyl chloride, or balsa wood, etc. Depending on the structural requirements of the desired part, cores 38 are also wrapped with one or more additional layers 40 of a fiber-reinforced material, as illustrated in FIGS. 1 and 2. To complete pre-form 20, another fiber layer 42 is disposed on top of fiber-wrapped cores 38.

Notably, the fiber-reinforced material (e.g., layer 28) is preferably a stitch-bonded fabric of glass or carbon fibers, but it may be cloth or other suitable fiber material which may be readily infused with resin. Other fiber-reinforced materials include fiber chop, a fibrous mat, etc. Further, cores are shown as having a rectangular, block shape, but other configurations are possible as well, and are selected based on the desired finished part. Also, although four cores 38 arranged adjacent to each other are shown in FIG. 1, the actual number and arrangement of cores is determined by the desired finished part.

Still referring to FIG. 1, insert 22 is configured to accommodate a pool of resin, as mentioned previously, and is pervious to the resin input to assembly 10. In particular, insert 22 includes a plurality of generally mutually spaced openings 44 extending through top surface 27 that allow the system to uniformly infuse pre-form 20 with resin. More particularly, insert 22 preferably includes a pair of stackable fluid transferable elements 46, 47, that are arranged, in part, to facilitate the creation of the resin pool. These elements include a generally planar plate 46 (e.g., a plate having a particular thickness such that the generally mutually spaced openings 44 through which resin can flow are cylindrical with a corresponding longitudinal axis), and an expanded metal pre-form 47 that is disposed intermediate plate 46 and bottom of rigid mold 12 and having a particular thickness to accommodate the resin pool. Pre-form 47 preferably includes a pair of conventional rigid wire layers 48, 50 that are configured to distribute the resin uniformly across the lower portion 18 of mold cavity 14. Rigid wire layers 48, 50, typically include a plurality of crossed-wire elements that are shaped to define a particular thickness, and allow lateral movement of uncured resin to create the resin to pool thereabout.

Figure 5:
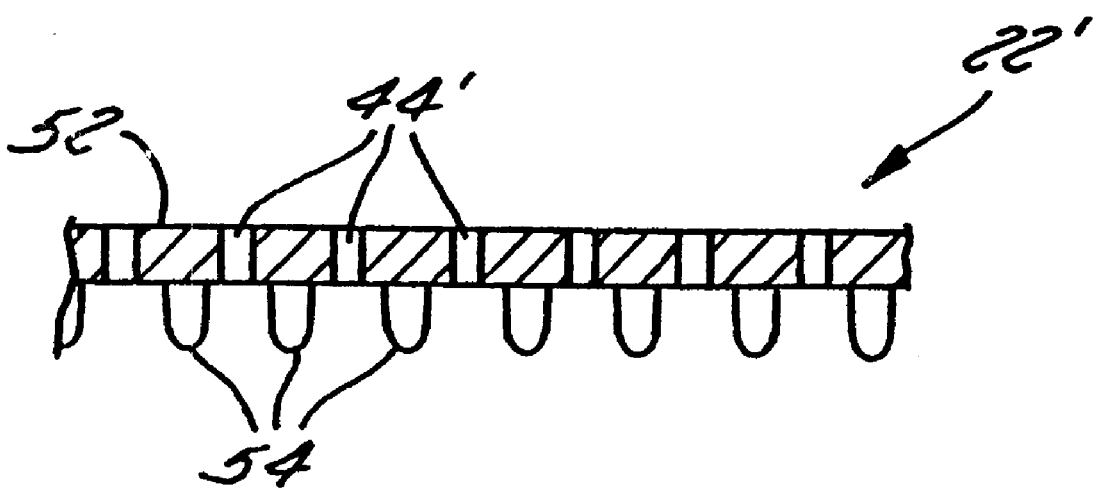
FIG. 5 is a cross-sectional view of an alternative insert according to the preferred embodiment.

Again, expanded metal pre-form 47 is preferably stacked with plate 46 to prop up plate 46 and define a volume which generally corresponds to lower portion 18 of cavity 14, a volume sufficient to accommodate the pool of resin. The metal elements of rigid wire layers 48, 50 typically run in a particular lengthwise direction such that by arranging the pair of rigid wire layers 48, 50, preferably at about 90° relative to one another, insert 22 facilitates complete and uniform distribution of the resin input to the system in lower portion 18 of cavity 14 to create the resin pool. Note that although insert 22 is shown and described herein as a plurality of fluid-transferable elements 46, 47 insert 22 may comprise a unitary sub-mold structure sufficiently thick to define a volume for accommodating the pool of resin, and comprising a flow paths in the bottom planar portions of its thickness and cylindrical holes or openings in its surface (e.g. upper surface 27) that is generally adjacent the pre-form 20. For example, referring to FIG. 5, an insert 22' includes an upper plate-like portion 52 having a plurality of mutually spaced cylindrical openings 44' formed therein. In FIG. 5, upper portion 52 is propped up from the bottom surface of rigid mold (not shown in FIG. 5) by a plurality of generally orthogonal extensions 54, preferably integrally formed on the bottom surface of upper portion 52, thus allowing creation of the resin pool. Such an insert 22 could be rigid, or more preferably, flexible such that it could be readily disposed in any rigid mold 12. Such a flexible insert would be particularly useful when using a VARTM process to produce a composite part having a complex shape with non-linear features.

Figure 3:
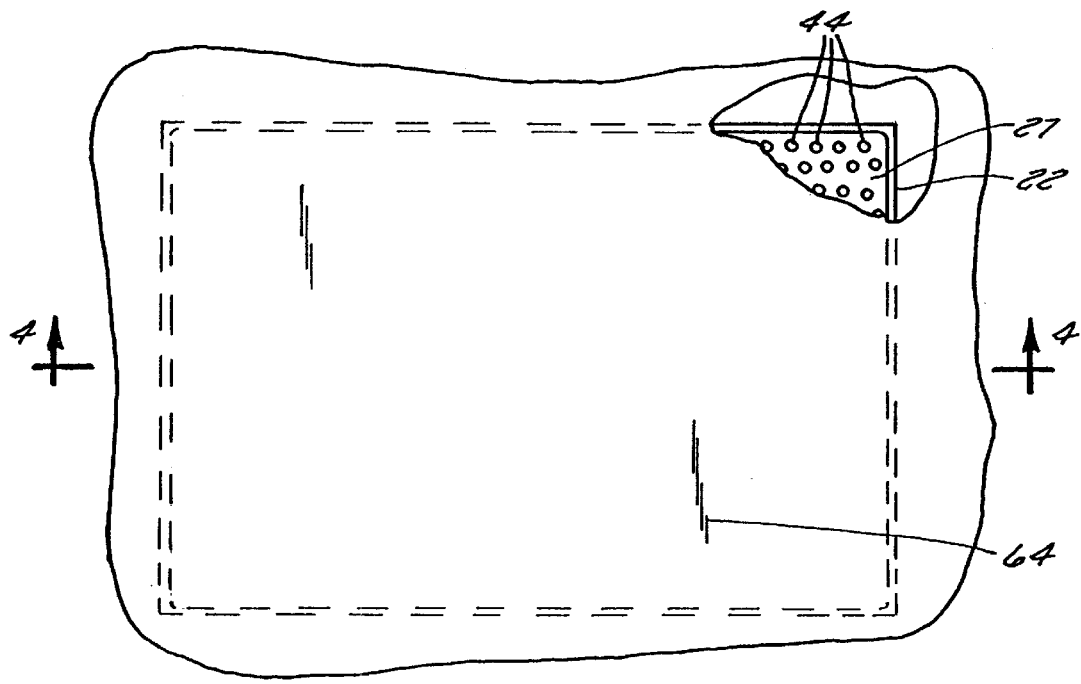
FIG. 3 is a partially broken away top plan view of FIG. 1.

To manufacture a cored composite part according to the preferred embodiment, the above components of apparatus 10 are assembled as shown in FIG. 2, and vacuum ports 62 (e.g., channels having a lengthwise slit for pulling vacuum therealong) are disposed on opposed sides of mold 12 adjacent surfaces 34, 36. Next, a vacuum bag 64 is then placed over vacuum ports 62 and pre-form 20, and sealed to mold 12 to maintain pressure in the system during manufacture of the composite part. Vacuum bag 64 may be sealed to mold 12 with a pliable sealant, e.g., a tacky tape. A top view illustrating these assembled components including top surface 27 of insert 22 including openings 44, as well as vacuum ports 62, is shown in FIG. 3.

Notably, due to vacuum pressure, vacuum bag 64 is drawn downwardly over its entire area against a plane defining the top surface of pre-form 20 to facilitate forming the part. Further, an optional peel-ply layer 63 may be located between the lower face of vacuum bag 64 and the top layer 42 of fiber-reinforced fabric of pre-form 20 to allow ready removal of vacuum bag 64, typically after the part is cured.

Continuing, wire layers 48, 50 are preferably stacked to define a volume which generally corresponds to lower portion 18 of cavity 14 for accommodating the resin pool, as described previously. The pool of resin is created by feeding resin to mold cavity 14 through feed ports 60 formed, for example, in rigid mold 12. Note that although feed ports 60 are shown formed in rigid mold 12, feed channels (e.g., conventional elongated channels having a lengthwise opening, a pervious spring, etc.) could be disposed along bottom surface 66 of rigid mold 12 to supply resin to system 10.

Next, after the resin is introduced to lower portion 18 of cavity 14, and thus insert 22, thus flooding lower portion 18, infusion of pre-form 20 is initiated. In particular, suction is the applied upon mold cavity 14 via vacuum ports 62 to draw vacuum upon the mold cavity. By disposing vacuum ports 62 on opposed sides of rigid mold 12 (see FIGS. 2 and 3), vacuum pressure is uniformly maintained within cavity 14. Moreover, openings 44 of insert 22 extend generally orthogonally to top surface 27 of the insert and are disposed in mutually spaced relationship adjacent to the entire bottom surface 26 of pre-form 20 (in particular, fiber-reinforced layer 28 of pre-form 20). Therefore, the pooled resin begins to flow upwardly, generally orthogonally to bottom surface of mold, towards openings 44 in insert 22. This is shown schematically in FIG. 4.

Figure 4:
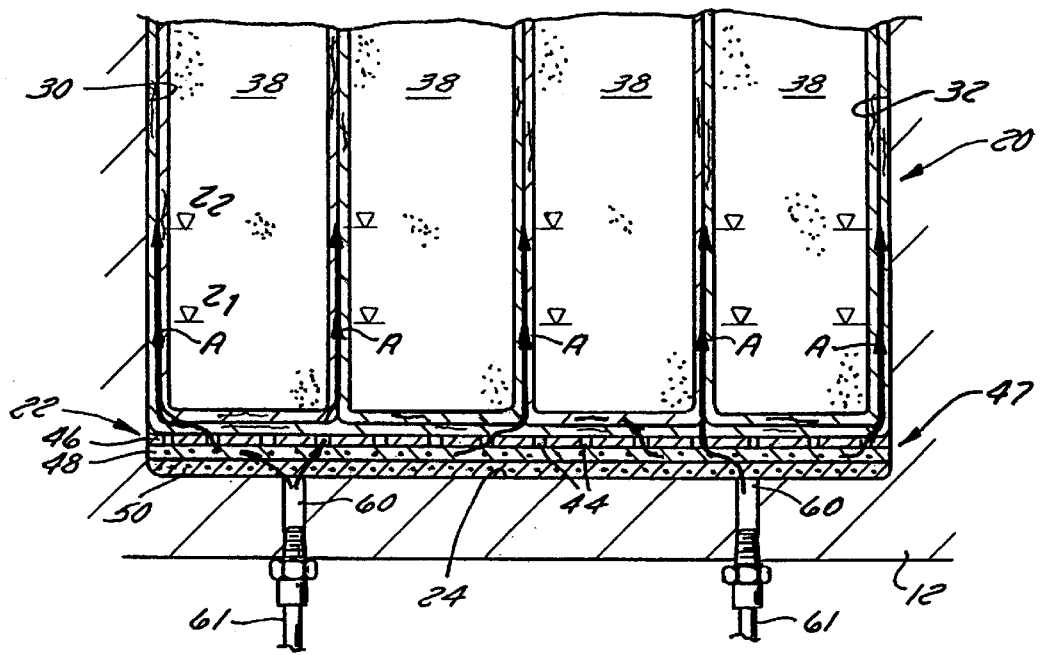
FIG. 4 is a sectional view taking along line 4—4 in FIG. 3.

In FIG. 4, resin is depicted traveling into pre-form 20 by a series of arrows marked "A." More particularly, the resin flow is shown at a particular instant during the infusion process. At this point, the resin flow has reached a level marked "$Z_1$," across its entire horizontal cross-section. At another instant during the infusion process, the resin reaches a level marked "$Z_2$" uniformly across the pre-form 20, i.e., in a plane parallel to the planar interface between insert 22 and pre-form 20. Notably, the pool of resin created prior to the infusion process, as well as disposing second mold portion or insert 22 in rigid mold 12 having a plurality of openings that operate to simultaneously feed resin to the pre-form facilitates this uniform, orthogonal flow of resin during VARTM infusion. Importantly, by feeding resin to pre-form along its entire footprint via openings 44, the uncured resin pulled under vacuum pressure does not need to move laterally to infuse different portions of the pre-form. Because the resin does not need to traverse laterally to infuse different lateral portions of pre-form 20, pre-form 20 is infused uniformly.

By realizing this uniform flow, the height of pre-form 20 is infused generally simultaneously laterally across planes orthogonal to the vertical resin flow. Therefore, unlike known systems, producing composite parts according to the preferred embodiment achieves uniform wet-out in significantly less time, while avoiding curing of resin that is introduced first to the assembly, i.e., prior to full infusion of the pre-form. Overall, the method and apparatus of the preferred embodiment produces composite parts in less time and with greater integrity (e.g., less non-infused dry spots) than conventional VARTM systems.

While the embodiments illustrated in the Figures and described above are presently preferred, it should be understood that these embodiments are offered by way of example only. The invention is not intended to be limited to any particular embodiment, but is intended to extend to various modifications that nevertheless fall within the scope of the appended claims.

What is claimed is:

1. An apparatus for use in molding a composite structure, the apparatus comprising:

an insert that is pervious to a flowable resin;

a mold having a cavity defining contiguous upper and lower portions, said upper portion adapted to receive a fibrous pre-form, and said lower portion adapted to receive said insert; and wherein said insert is rigid and adapted to accommodate a pool of the flowable resin so as to facilitate resin flow in a direction orthogonal to a bottom surface of said mold.

2. An apparatus for use in molding a composite structure, the apparatus comprising:

an insert that is pervious to a flowable resin;

a mold having a cavity defining contiguous upper and lower portions, said upper portion adapted to receive a fibrous pre-form, and said lower portion adapted to receive said insert;

wherein said insert is adapted to accommodate a pool of the flowable resin;

a vacuum bag that encloses said mold cavity; and a vacuum port that draws a vacuum upon said mold cavity.

3. The apparatus according to claim 2, wherein said vacuum port is intermediate said mold and said vacuum bag.

4. The apparatus of claim 1, wherein said insert includes a plurality of fluid transferable elements.

5. The apparatus of claim 4, wherein said fluid transferable elements comprise a plate and an expanded metal pre-form, wherein said plate and said expanded metal pre-form are configured to facilitate resin flow in a direction generally orthogonal to the bottom surface of said mold to distribute the resin uniformly across said mold cavity.

6. The apparatus according to claim 1, wherein said fibrous pre-form comprises a layer of fiber-reinforced fabric.

7. The apparatus according to claim 6, wherein said fibrous pre-form comprises a core.

8. The apparatus according to claim 7, wherein said fabric layer separates said insert from said core.

9. The apparatus according to claim 8, wherein said core is foam or balsa wood.

10. The apparatus according to claim 7, wherein said core is wrapped in a second fiber layer.

11. The apparatus according to claim 6, wherein said fiber-reinforced fabric is a stitch-bonded fabric.

12. The apparatus according to claim 1, wherein the resin flows through said insert in a direction generally orthogonal to a planar interface between said lower portion and said upper portion.

13. An apparatus for use in molding a composite structure, the apparatus comprising:

a rigid mold having a shape corresponding to a shape of the composite structure and configured to receive a fibrous pre-form;

a rigid insert defining a reservoir for containing a pool of resin;

wherein said insert is disposed generally adjacent to at least a portion of said rigid mold intermediate said rigid mold and said fibrous pre-form; and includes a plurality of mutually spaced openings adjacent to a bottom surface of the pre-form and through which resin flows in a direction generally orthogonal to a planar interface between said insert and said fibrous pre-form so as to facilitate flow of the resin in a direction orthogonal to a bottom surface of said mold.

14. The apparatus of claim 13, wherein said insert includes a plurality of mutually spaced openings adjacent to a bottom surface of the pre-form and through which resin flows in a direction generally orthogonal to a planar interface between said insert and said fibrous pre-form.

15. An apparatus for use in molding a composite structure, the apparatus comprising:

a rigid mold having a shape corresponding to a shape of the composite structure and configured to receive a fibrous pre-form;

an insert defining a reservoir for containing a pool of resin;

wherein said insert is disposed generally adjacent to at least a portion of said rigid mold intermediate said rigid mold and said fibrous pre-form; and includes a plurality of mutually spaced openings adjacent to a bottom surface of the pre-form and through which resin flows in a direction generally orthogonal to a planar interface between said insert and said fibrous pre-form, and wherein said openings are formed in a plate positioned generally parallel to a bottom surface of said rigid mold and displaced therefrom.

16. The apparatus of claim 15, wherein said insert includes an expanded metal pre-form disposed intermediate said rigid mold and said plate.

17. The apparatus of claim 16, wherein said expanded metal pre-form includes two layers of rigid wire oriented orthogonally to one another.

18. The apparatus of claim 13, further comprising:

an inlet coupled to a source of resin and to said first mold portion to flood a volume defined by said insert with resin;

a layer of material coupled to said rigid mold to seal the apparatus; and at least one vacuum port sealed to said layer of material for applying vacuum pressure to the apparatus.

19. The apparatus of claim 13, wherein the fibrous pre-form includes a core.

20. A method of vacuum assisted resin transfer molding, the method comprising:

providing a mold;

positioning an insert defining a reservoir for containing a pool of resin and a plurality of mutually spaced openings in the mold;

positioning a fibrous pre-form on the insert;

injecting resin through the mold to flood the reservoir;

sealing the mold with a vacuum bag prior to said injecting step; and applying vacuum pressure to the apparatus so as to pull the resin through the openings of the insert in a direction generally parallel to a corresponding longitudinal axis of each of the openings and generally simultaneously across the entire planar interface between the insert and the pre-form; and curing the resin to form a composite structure.

21. The method according to claim 20, wherein the fibrous pre-form comprises a core and a fiber layer.

22. The method according to claim 21, wherein the fiber layer is a stitch-bonded fabric.

23. A method of vacuum assisted resin transfer molding, the method comprising:

providing a mold;

positioning an insert defining a reservoir for containing a pool of resin and a plurality of mutually spaced openings in the mold;

positioning a fibrous pre-form on the insert;

injecting resin through the mold to flood the reservoir; and wherein the insert includes a plate defining the mutually spaced openings, and a pair of rigid wire layers, wherein the pair of rigid wire layers, wherein the pair of rigid wire layers are oriented orthogonally to one another to uniformly distribute the resin in the reservoir.

24. An apparatus for forming a composite structure using VARTM process that employs a rigid mold, the apparatus comprising:

an insert disposed adjacent to a bottom surface of the rigid mold, wherein said insert facilitates resin flow in a direction generally orthogonal to the bottom surface;

wherein said insert is configured to accommodate a pool of a resin; and wherein said insert includes a plurality of mutually spaced openings to communicate the resin to the pre-form, and wherein, during manufacture of the composite structure, resin flows uniformly across the entire planar interface between said insert and the pre-form.

* * * * *